(12) United States Patent
Cucchi

(10) Patent No.: US 11,992,871 B2
(45) Date of Patent: May 28, 2024

(54) APPARATUS FOR ADVANCING AND SUPPLYING BARS TO A MACHINE TOOL

(71) Applicant: CUCCHI GIOVANNI & C. S.R.L., Bussero (IT)

(72) Inventor: Cesare Cucchi, Bussero (IT)

(73) Assignee: CUCCHI GIOVANNI & C. S.R.L. (IT)

( * ) Notice: Subject to any disclaimer, the term of this patent is extended or adjusted under 35 U.S.C. 154(b) by 972 days.

(21) Appl. No.: 16/966,062

(22) PCT Filed: Jan. 30, 2019

(86) PCT No.: PCT/IB2019/050739
§ 371 (c)(1),
(2) Date: Jul. 30, 2020

(87) PCT Pub. No.: WO2019/150271
PCT Pub. Date: Aug. 8, 2019

(65) Prior Publication Data
US 2020/0353531 A1    Nov. 12, 2020

(30) Foreign Application Priority Data

Jan. 31, 2018   (IT) ......................... 102018000002275

(51) Int. Cl.
*B21D 43/00*  (2006.01)
*B23B 13/04*  (2006.01)

(52) U.S. Cl.
CPC ............ *B21D 43/006* (2013.01); *B23B 13/04* (2013.01)

(58) Field of Classification Search
CPC .. E04H 4/084; B66D 3/20; B66D 3/26; E04F 10/08; B62J 45/41; B62J 45/42; B62J 50/22; B62J 27/00; B62K 11/02; B65G 1/0457; B65G 1/127; B23B 13/02; B21D 43/006
USPC ............................................................. 82/89
See application file for complete search history.

(56) References Cited

U.S. PATENT DOCUMENTS 3,815,930 A   6/1974  Mattes
4,122,735 A  10/1978  Evers

FOREIGN PATENT DOCUMENTS

EP           2943302 B1   3/2017

*Primary Examiner* — Ronald P Jarrett
(74) *Attorney, Agent, or Firm* — Laubscher & Fretwell, P.C.

(57) ABSTRACT

An apparatus for advancing and supplying bars to a machine tool, comprises:
 a plurality of tubular elements each suitable for containing longitudinally a respective bar;
 at least one first carriage unit and a second carriage unit supporting the tubular elements and movable longitudinally on a drum structure to move the tubular elements parallel to an advancement direction for the bars;
 the drum structure extends from a front end, suitable for being placed in a position adjacent to a spindle of the machine tool, to a rear end, suitable for being further from the machine tool.
Each tubular element is provided with a feed finger unit that is suitable for clamping and pulling a respective bar to advance the bar advancement direction.

18 Claims, 13 Drawing Sheets

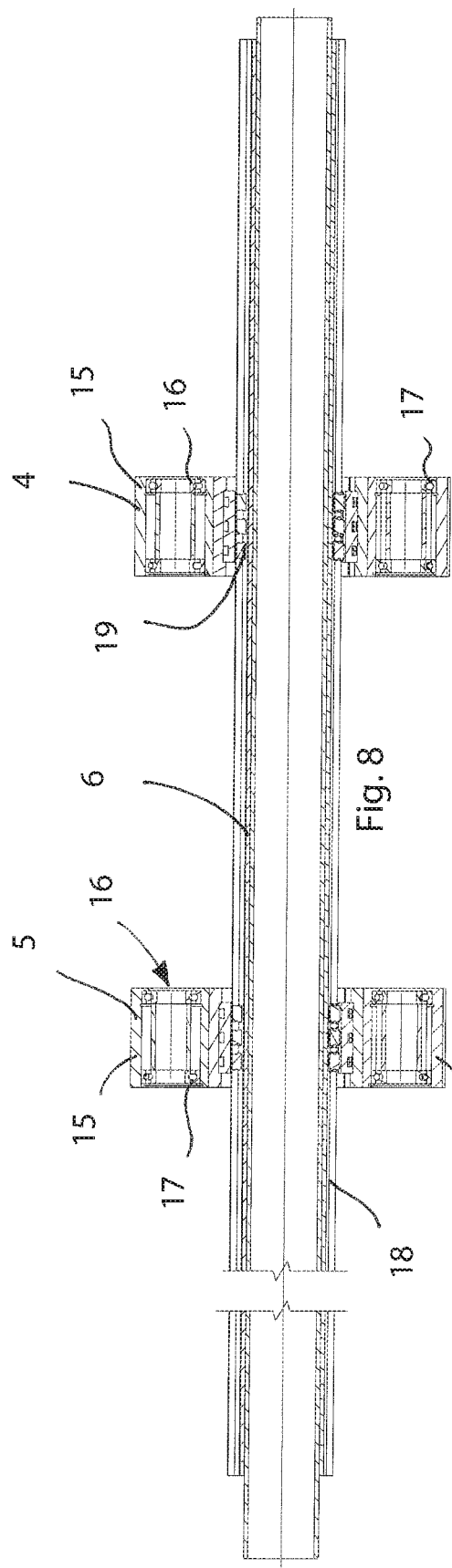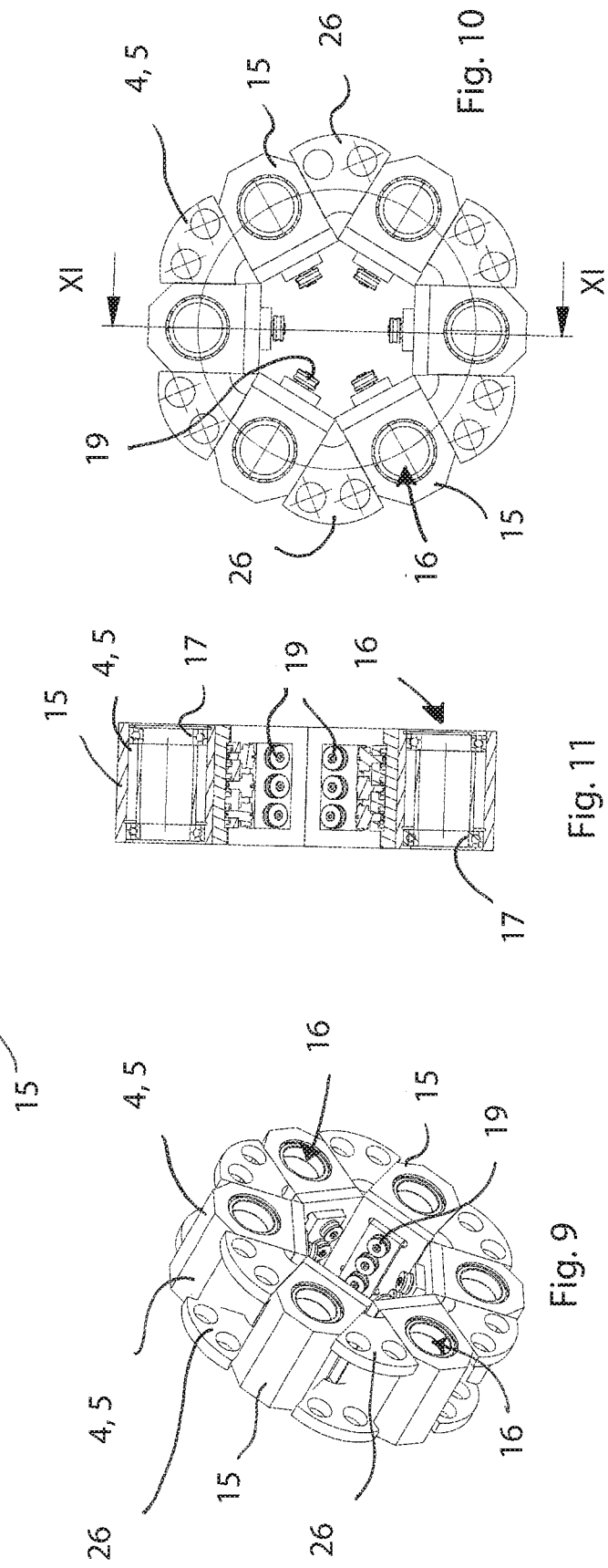

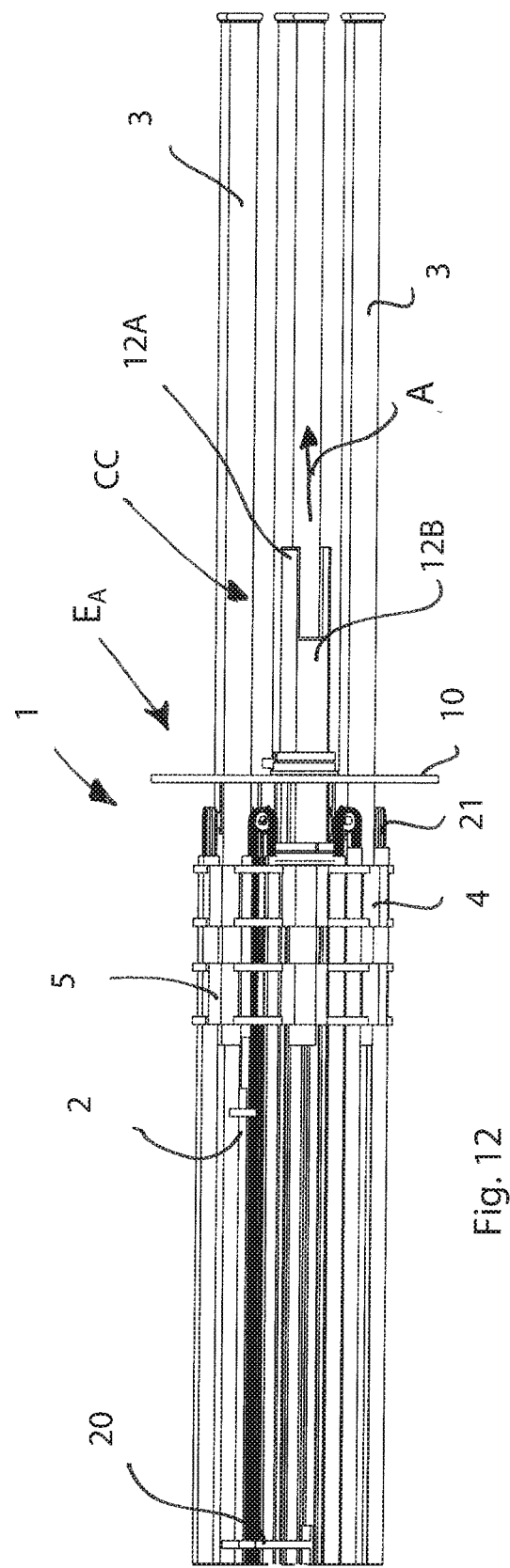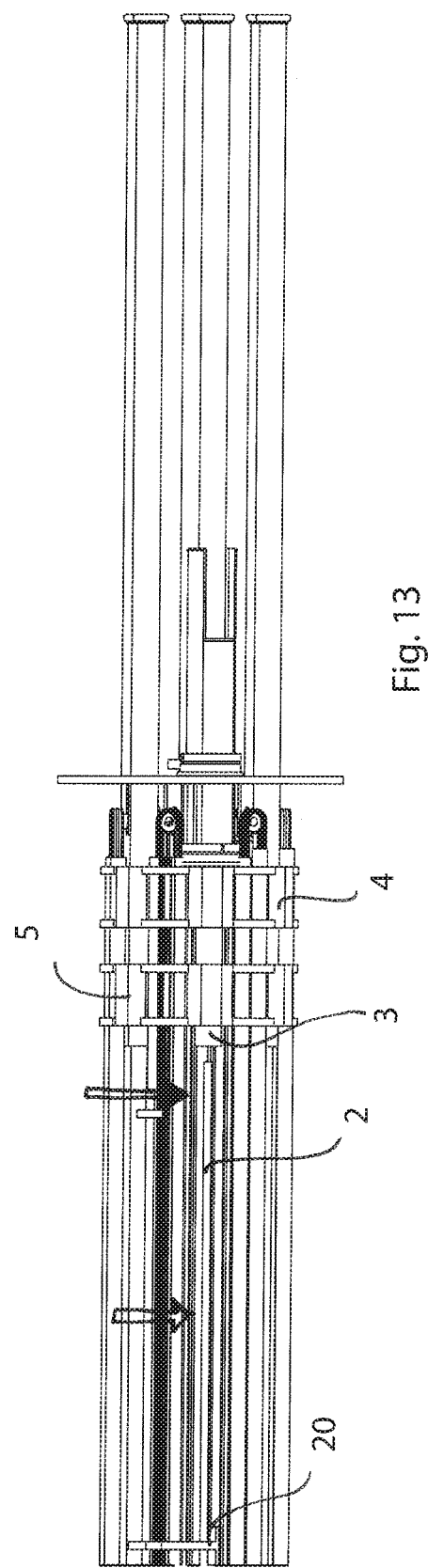

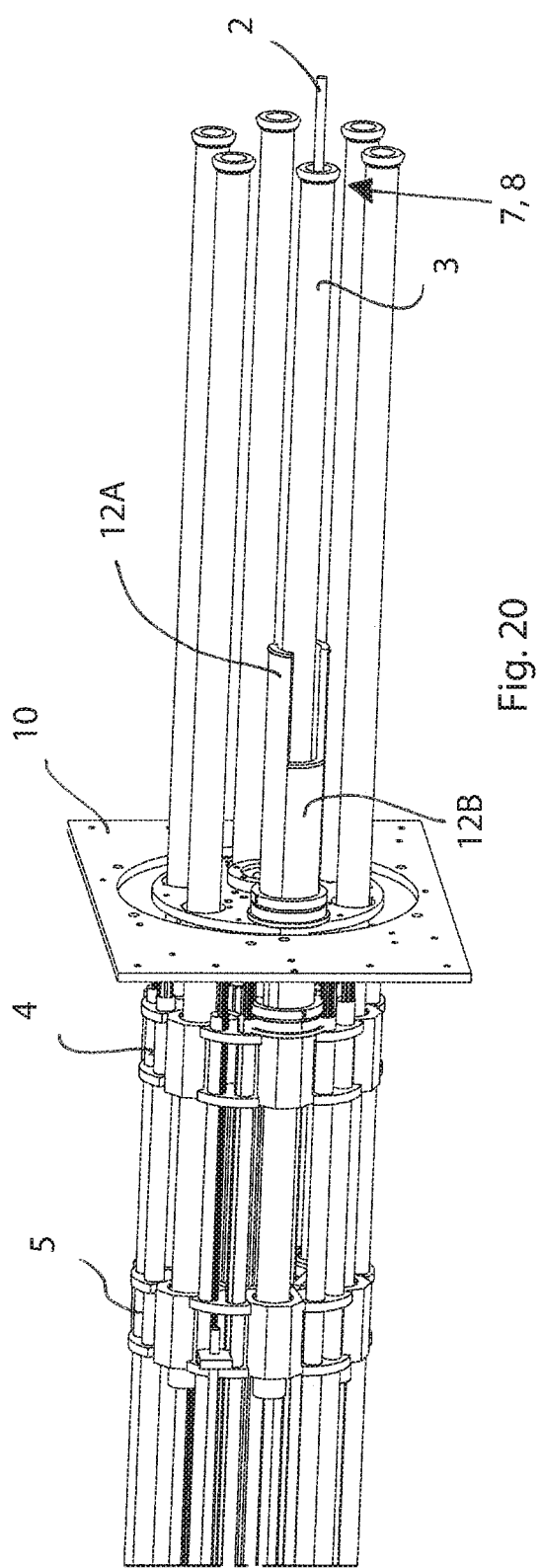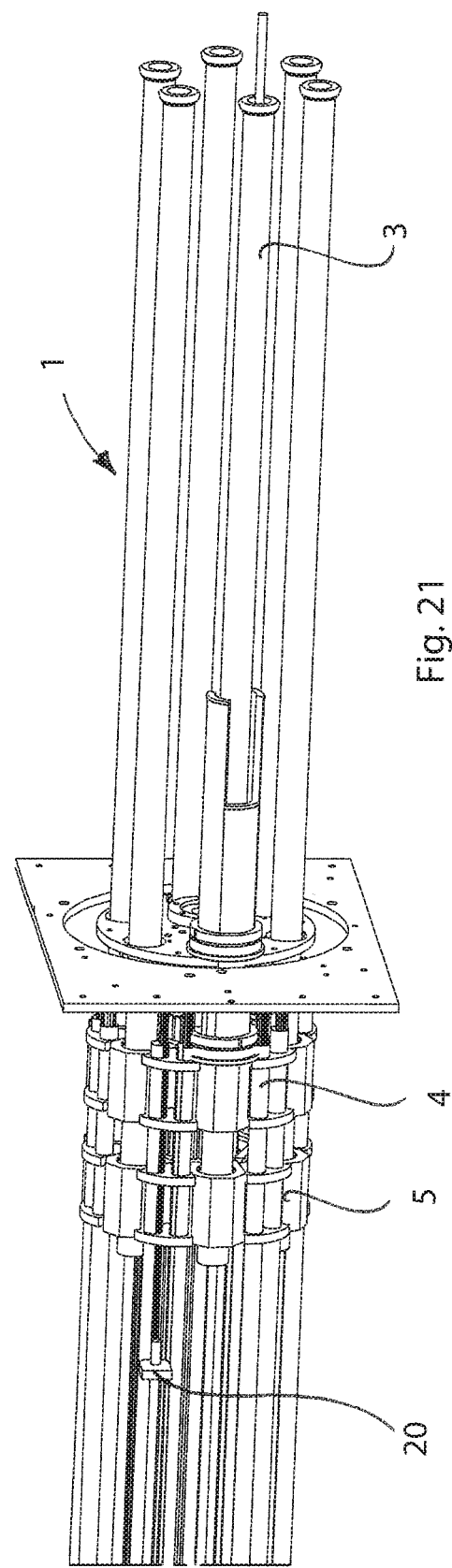

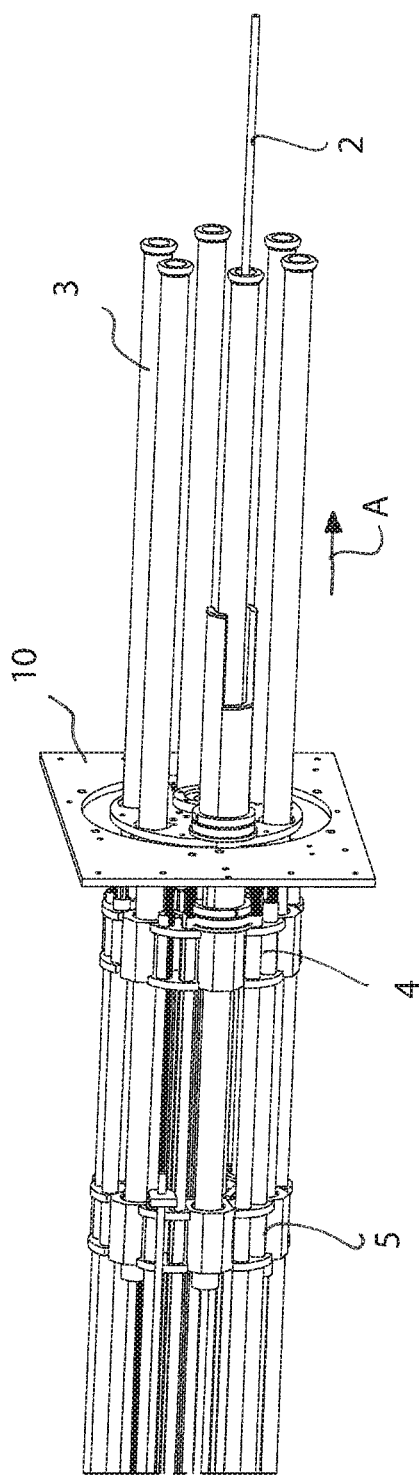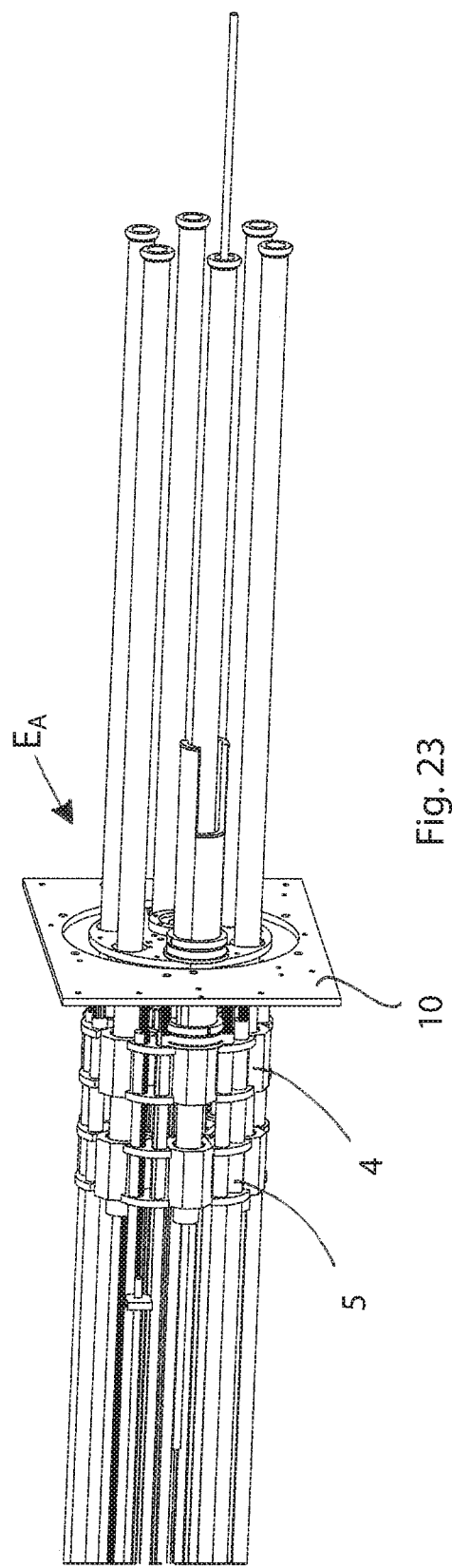

APPARATUS FOR ADVANCING AND SUPPLYING BARS TO A MACHINE TOOL

CORSS-REFERENCE TO RELATED APPLICATIONS

This application is a § 371 National Stage Entry of PCT/IB2019/050739 filed Jan. 30, 2019 entitled "Apparatus for Advancing and Supplying Bars to a Machine Tool." Application No. PCT/IB2019/050739 claims priority of IT102018000002275 filed Jan. 31, 2018. The entire contents of these applications are incorporated herein by reference in their entireties.

BACKGROUND OF THE INVENTION

The present invention relates to an apparatus for advancing and supplying bars to a machine tool, in particular to an automatic lathe.

Apparatuses are known for automatically supplying bars to the spindle of a lathe, which are provided with a support drum that extends longitudinally and supports a plurality of openable guides for the bars. The support drum is configured for rotating around the longitudinal axis thereof.

The openable guides are distributed both longitudinally along the drum and circumferally on the latter.

Each openable guide comprises a fixed part, i.e. mounted in a stationary part on the drum, and a part is transversely movable to the longitudinal axis of the drum.

The movable part, which is movable by suitable mechanism, is first moved away and then moved near the respective fixed part so as to enable a bar to be inserted that has to be guided during processing.

A plurality of bar-pushing members is further provided that are supported movably axially on a rear portion of the aforesaid elongated drum, each bar-pushing member being arranged for pushing to the lathe, a respective bar along a respect group of aforesaid openable guides aligned longitudinally.

The bar-pushing members then intervene at the rear, i.e. exert a thrust on the rear end of the bar, i.e. the end of the bar that is further from the spindle of the machine tool to which it has to be supplied.

Once supplying of a bar has been completed it is thus necessary to return the bar-pushing member totally to the rear end of the apparatus, travelling the entire longitudinal dimension of the support drum, so as not to interfere with or hinder the task of loading a successive bar.

In order to be able to insert a new bar, it is thus necessary for the bar-pushing member to retract substantially over the entire stroke to return to a position further upstream with respect to the supply direction and this slows significantly the operating time of the apparatus.

Another drawback of this apparatus, in addition to unsatisfactory operating times, is that it is structurally rather complex and thus involves rather high manufacturing costs. Further, the configuration that provides for the bar-pushing member acting to the rear on the bar unfortunately inevitably entails an increase in the longitudinal overall dimension, because of the operating spaces required of necessity by the bar-pushing member.

A further limit of the aforesaid apparatus is linked to the operation of evacuating the residual portion at the end of the supplying cycle. As the bar is pushed at the rear and thus has the possibility of moving in only one direction, i.e. only approaching to the machine tool, the residual portion has necessarily to be expelled and dropped outside beyond the front end of the drum, i.e. in a zone interposed between the supplying apparatus and the spindle of the machine tool. Obviously, the risk is not excluded that the residual portion can in this zone damage the spindle or may adversely interfere with the machining tasks performed by the machine tool.

The structural complexity of the apparatus that has just been disclosed inevitably entails greater problems of reliability with resulting costly maintenance tasks.

The structural complexity caused by the openable guides complicates possible maintenance or parts replacement operations, thus inevitably causing long machine downtime, with resulting financial loss for the user.

SUMMARY OF THE INVENTION

One object of the present invention is to improve and simplify structurally and functionally the apparatuses for supplying and advancing machine tool bars.

Another object is to provide an apparatus for advancing and supplying bars that is provided with a higher operating speed that is able to slash drastically the bar supplying cycle time.

A further object is to provide an apparatus for advancing and supplying bars that, having a structural configuration that is more simplified than that of known apparatuses, entails lower manufacturing costs and shorter maintenance time.

The above can be achieved by an apparatus for advancing and supplying bars to a machine tool as defined in claim 1.

Owing to the invention the aforesaid drawbacks are overcome.

In particular, the apparatus according to the invention is structurally configured in an simplified manner with respect to the prior art apparatuses, and this entails an increase in mechanical reliability and also a reduction in manufacturing and maintenance costs.

The particular configuration of the apparatus, owing to the action of guiding and containing the tubular elements, enables possible flexures of the rotating bars to be minimized, especially in the case of thin bars, i.e. bars having very reduced cross sections; in addition, owing to the feed finger units, loading and supplying of the bars is significantly simplified and accelerated, further enabling the residual portions of the bars to be expelled, inside the volume bounded by the apparatus, thus far from the spindle of the machine tool, which is thus protected from possible risks of damage.

Further features will be clear from the appended claims and the description.

BRIEF DESCRIPTION OF THE FIGURES

The invention can be better understood and implemented with reference to the attached drawings, which illustrate an embodiment thereof by way of non-limiting example, in which:

FIG. 4a is a fragmentary view in which a driving device for driving the apparatus is visible;

FIG. 4b shows another embodiment of the driving device of FIG. 4a;

FIG. 8 is a longitudinal section taken along the plane VIII-VIII in FIG. 7;

FIGS. 9 and 10 are two different views of a carriage of the apparatus;

FIG. 11 is a section of the carriage taken along the plane XI-XI in FIG. 10;

FIGS. 12 to 23 show a sequence of operating steps of the apparatus.

DETAILED DESCRIPTION

Figure 1:
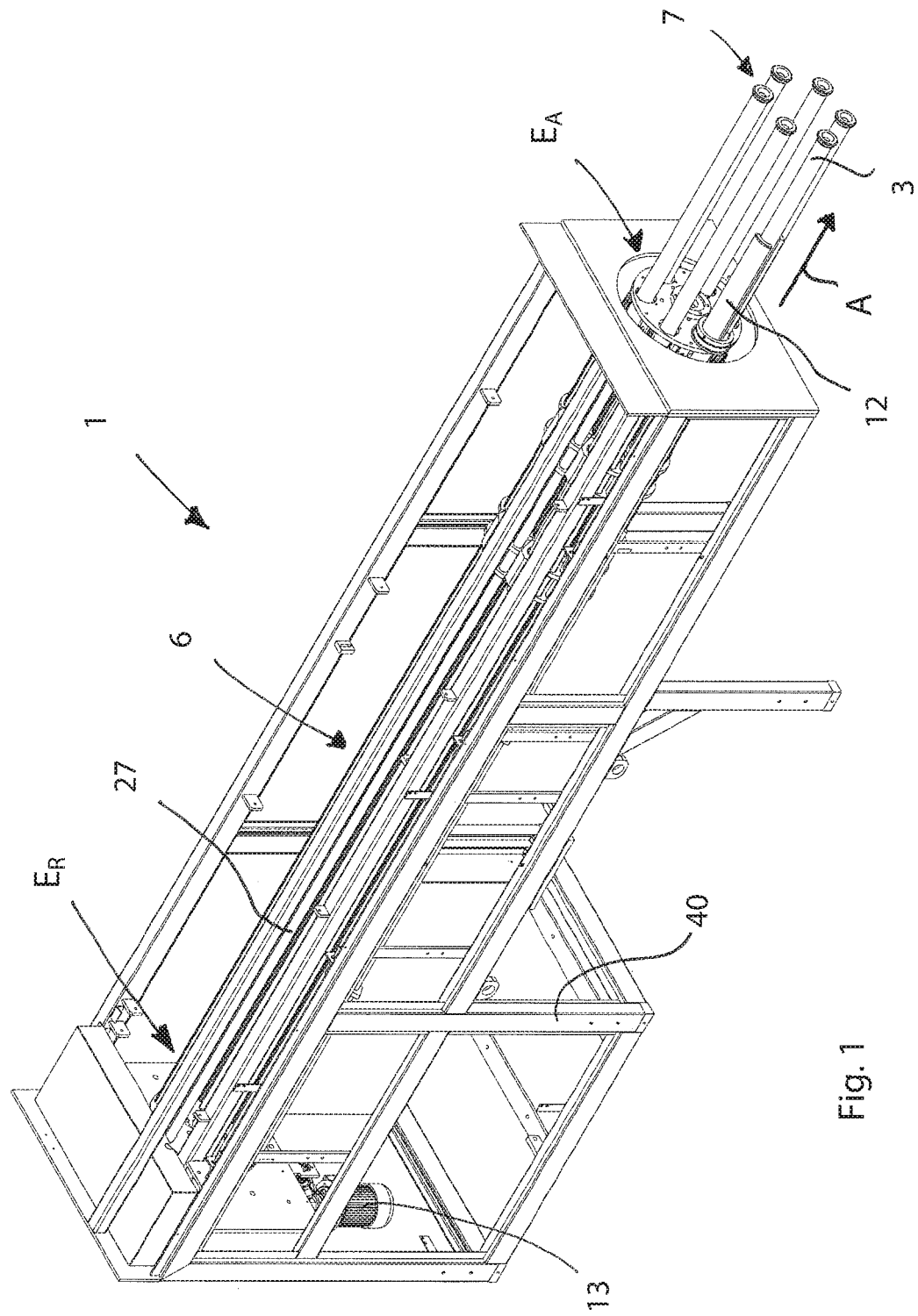
FIG. 1 is a perspective view of the apparatus according to the invention, fitted to a frame from which, for greater clarity, some parts have been removed, such as a housing and protection casing.
Figure 2:
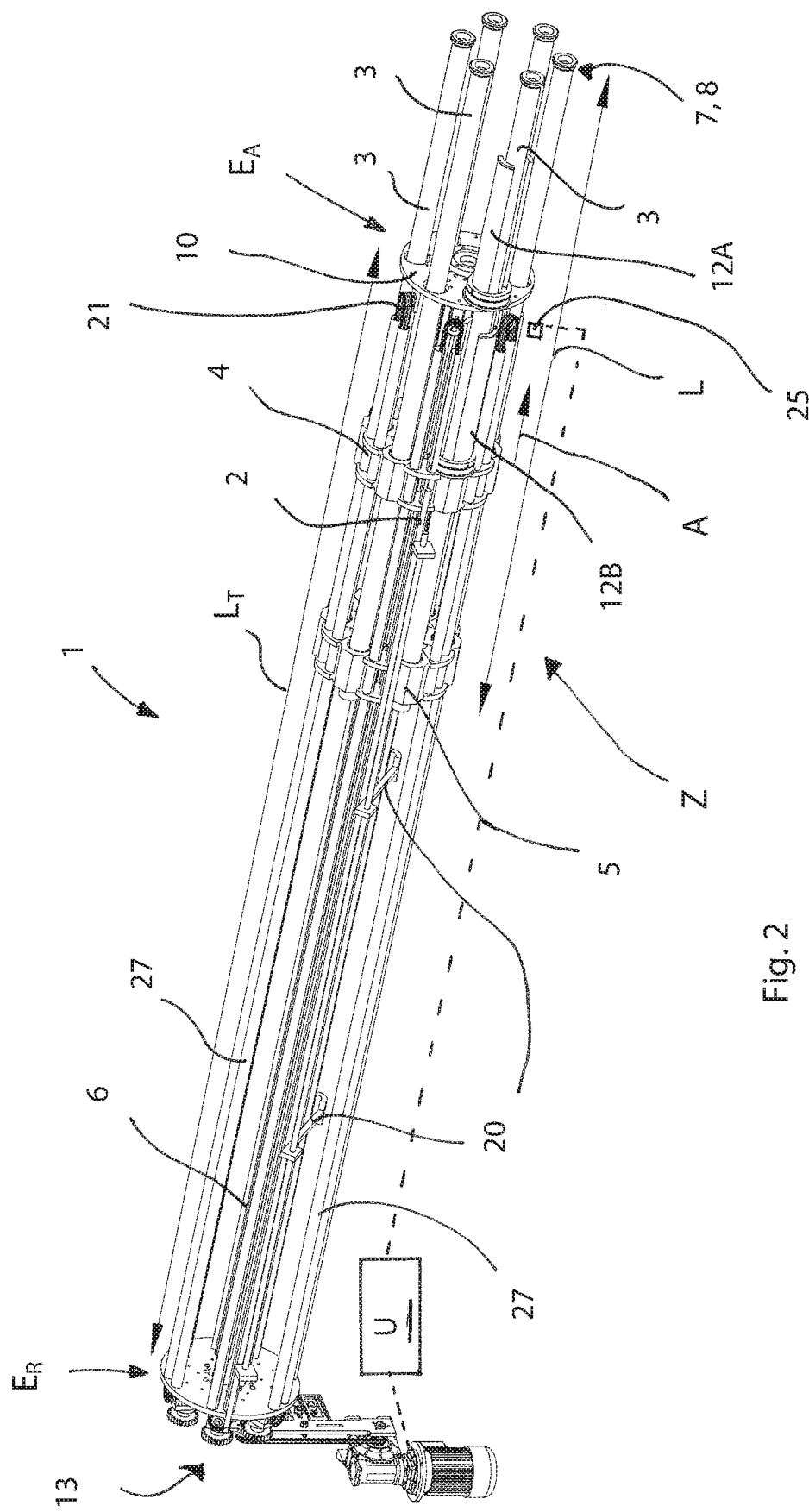
FIG. 2 is a perspective view of the apparatus according to the invention.
Figure 3:
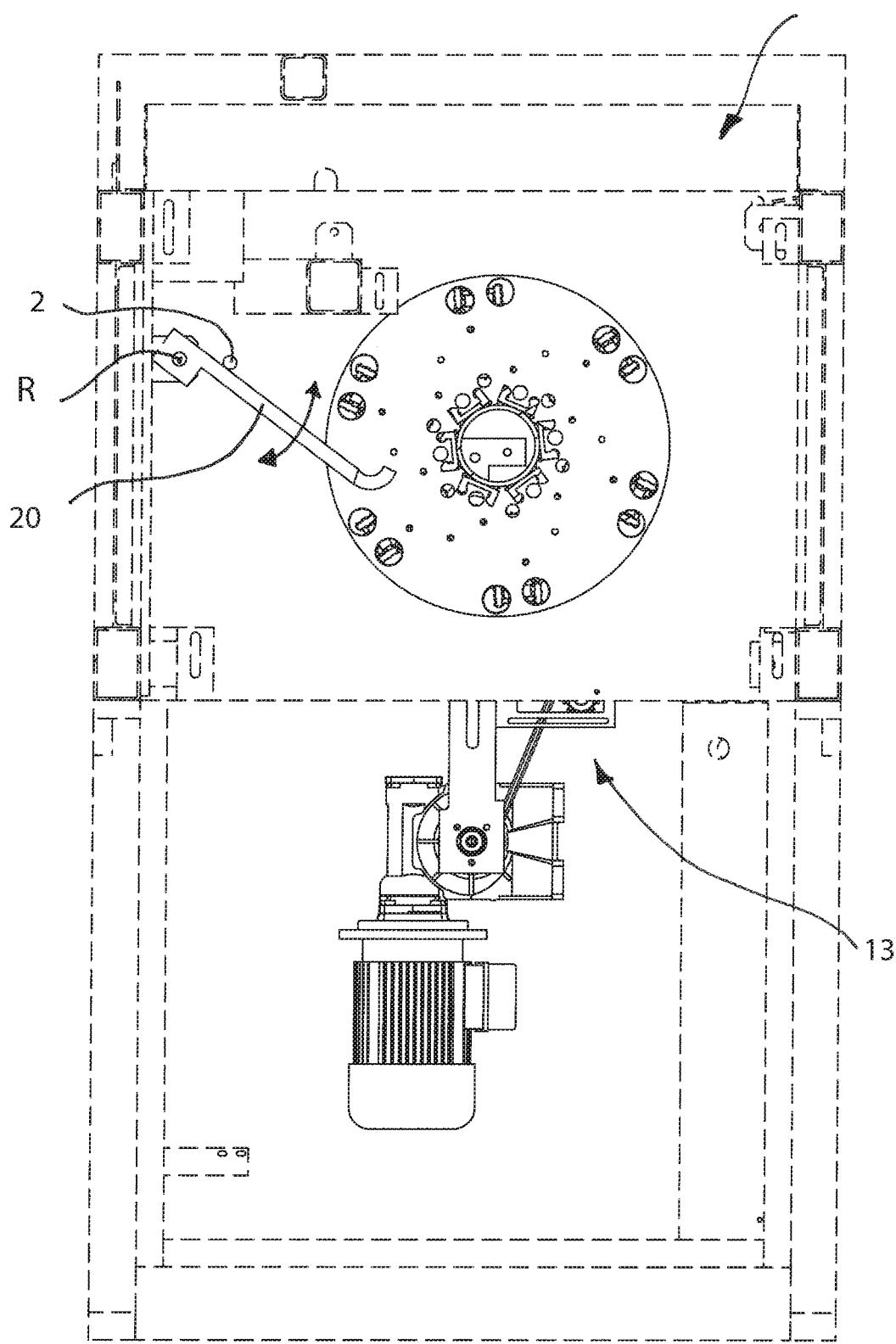
FIG. 3 is a cross section of the apparatus according to the invention.

With reference to the attached Figures, an apparatus 1 is shown for supplying, automatically, bars 2 to a machine tool, in particular to a lathe that can be of the single spindle or multi-spindle type. By way of example, the lathe of single-spindle type is configured to perform a single machining task on one bar at a time, whereas the lath of multi-spindle type enables several bars to be machined simultaneously, or enables a bar to be subjected to subsequent machining tasks of different type, i.e. it has several machining stations that can have the same tools, or also tools that are different from one another.

The apparatus 1 is provided with a support frame 40 with panels (not shown) to cover and protect the inner components.

The apparatus 1 has an end that is suitable for being placed in a position adjacent to a spindle of the lathe, and a longitudinal axis of which extends, that, during operation, is aligned on or anyway parallel to the rotation axis of the spindle to be supplied.

The apparatus 1 is provided with several tubular elements 3 each suitable for containing longitudinally a respective bar 2 to be supplied and comprises at least one first carriage unit 4, or front carriage unit 4, and a second carriage unit 5, or rear carriage unit 5, arranged for supporting these tubular elements 3.

Both the first carriage unit 4 and the second carriage unit 5 each consist of a plurality of carriage elements 15, that are integral with one another or decoupled from and independent of one another, as disclosed better below.

Each tubular element 3, more precisely, is a hollow cylindrical bar. Thus, advantageously, the tubular elements 3, which act as continuous containing cylinders, have a very simplified structural configuration.

The first carriage unit 4 and the second carriage unit 5 are movable longitudinally on a drum structure 6 to move the tubular elements 3 in the advancement direction A of the bars 2.

The drum structure 6 extends from a front end $E_A$, suitable for being placed in a position adjacent to the spindle of the machine tool, to a rear end $E_R$, so as to be further from the spindle, thus from the machine tool.

Each tubular element 3 is provided with a feed finger unit 7, disclosed better below, that is suitable for clamping and pulling the respective bar 2 so as to make the bar 2 advance in advancement direction A.

Each feed finger unit 7 is fitted in a front end 8 of the respective tubular element 3 to be nearer the spindle of the machine tool.

Each tubular element 3 extends over a length L approximately equal to or greater than half of a total length $L_T$ of the drum structure 6.

Owing to this configuration, the tubular elements 3 are able to contain, internally, isolated from the exterior, the bars 2 for a significant length. This is particularly appreciable when the bars 2 have greatly reduced cross sections, i.e. they are very thin and for this reason they are subject to undergoing flexure because of the centrifugal action during rotation induced by the spindle.

This is avoided owing to the tubular elements 3 that accompany and support the bar 2 as far as complete introduction into the spindle and for the entire supply time. Amongst other things, the aforesaid configuration also entails a reduction of the noises associated with the rotation of the bar 2.

Each feed finger unit 7 comprises gripping elements 9 provided with conical coupling surfaces and with gripping surfaces for clamping and pulling the bar 2.

The gripping surfaces are made of plastic or rubber or metal or another material, and have a high sliding friction coefficient; they are then shaped for generating a grip contact with the surface of the respective bar 2 so as to be able to push the latter in the advancement direction A to the spindle.

The gripping elements 9 are further configured to loosen the clamping action on the surface of the bar 2 and instead permit a relative slide of the feed finger unit 7 along the surface of the respective bar 2 in a direction opposite the supplying direction of the bar 2, when the respective tubular element 3 is moved away from the said machine tool.

In other words, when the tubular element 3 is advanced in the advancement direction, thus to the spindle, the gripping elements 9, arranged around the bar 2, receive from the tubular element 3, by the conical coupling, a thrust action that compresses the gripping elements 9 against the interposed bar 2. In this manner firm clamping of the bar 2 is achieved that is thus dragged automatically by the feed finger unit 7 to the spindle.

Vice versa, when the tubular element 3 is retracted and thus moved away from the spindle, we automatically witness loosening of the thrust action on the gripping elements 9, which accordingly undergo slight radial expansion, the clamping action on the bar 2 thus ceasing. In this manner, the tubular element 3, during retraction, does not drag the bar 2 with it.

Owing to the feed finger units 7, a subsequent alternating backward and forward movement of the tubular elements 3 is translated into a series of one-directional advancement steps of the bars 2 to the spindle. Positioning each feed finger unit 7 in the front end 8 of the respective tubular element 3 ensures a correct supply of the entire bar 2 to the spindle.

The drum structure 6 comprises, at a front end $E_A$ thereof, a front end flange 10, provided with respective openings 11 through which the tubular elements 3 can slidably traverse the front end flange 10 to protrude, beyond the front end $E_A$, to the spindle of the machine tool.

The tubular elements 3 are axially integral with the second carriage unit 5, and axially movable with respect to the first carriage unit 4.

The first carriage unit 4 and the second carriage unit 5 are movable from a configuration of mutual proximity in which they are packed towards the front end $E_A$ so that the tubular elements 3 protrude by a substantial amount outside towards the machine tool, to a mutually spaced configuration, in which the second carriage unit-5 is further from the front end $E_A$ so as to drag the tubular elements 3 to the rear end $E_R$ and enable the bar 2 to be inserted progressively into the respective tubular element 3.

In the configuration of mutual proximity of the two carriage units 4, 5—to which completion of the supply stroke of a bar 2 to the spindle corresponds —, the two carriage units 4, 5 are "packed" against the front end flange 10, thus far from a central zone intended to receive a subsequent bar 2 to be loaded into a respective tubular element 3. In other words, the two carriage units 4, 5 do not interfere with the bar 2, which—owing to a lever unit 20 disclosed below—is removed from a magazine connected to the apparatus 1 and is lowered to the correct height to be axially aligned on the tubular element 3 that is intended to receive the bar 2 internally.

The front end 8 of each tubular element 3 has a radially widened shape that prevents separating thereof from the first carriage unit 4 (front carriage) and permits dragging of the first carriage unit 4 to the rear end $E_R$.

At least one tubular element 3 comprises a respective sleeve unit 12, structurally configured for containing at least one part of the advancing bar 2 and acting as a protective screen.

Figure 17:
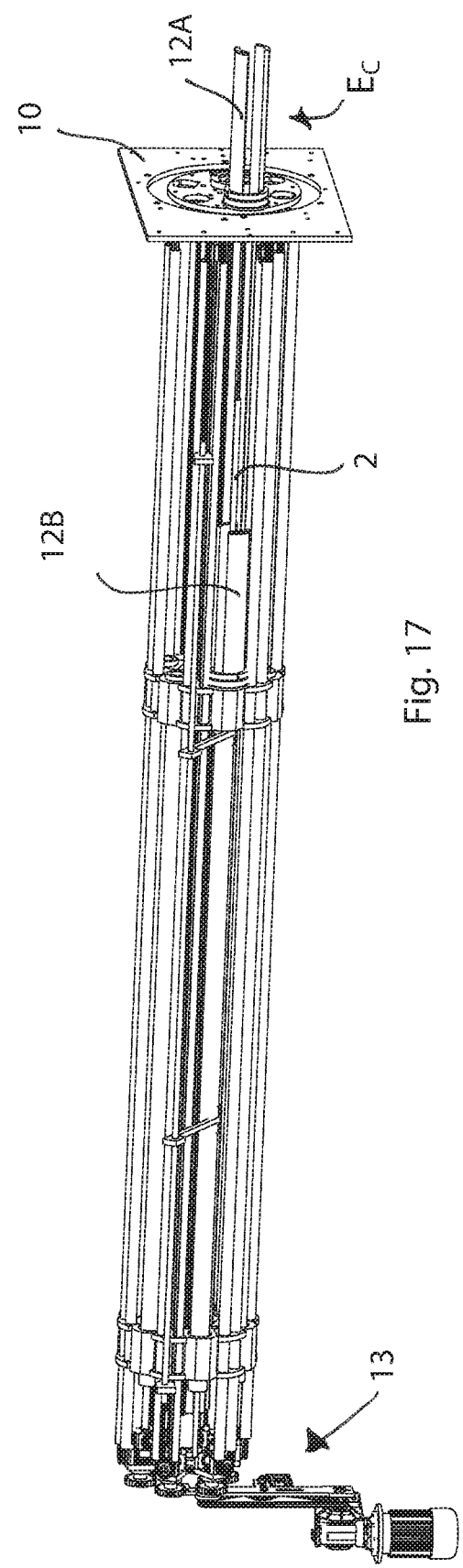
Figure 18:
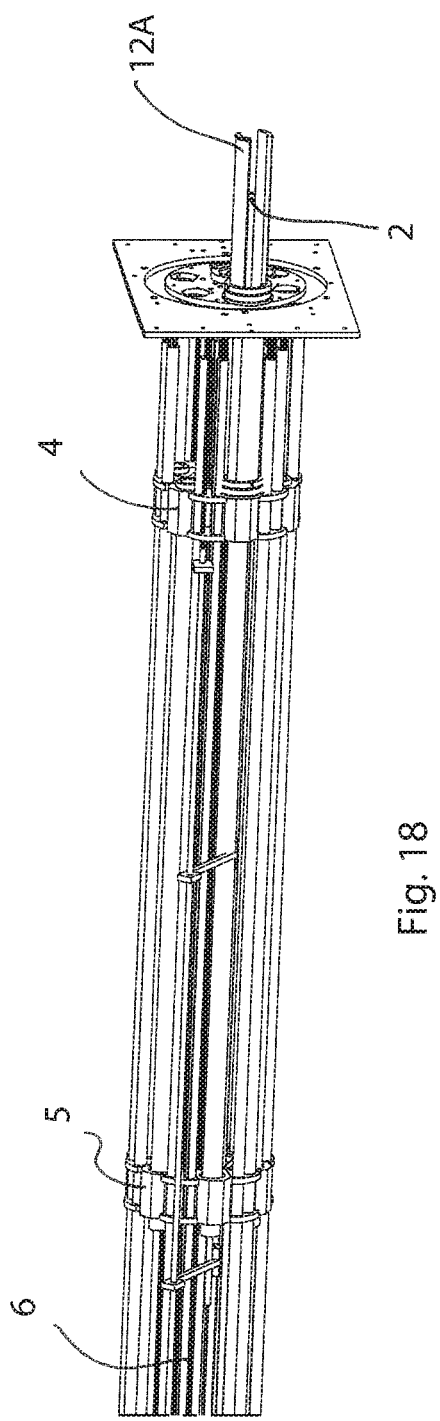
Figure 19:
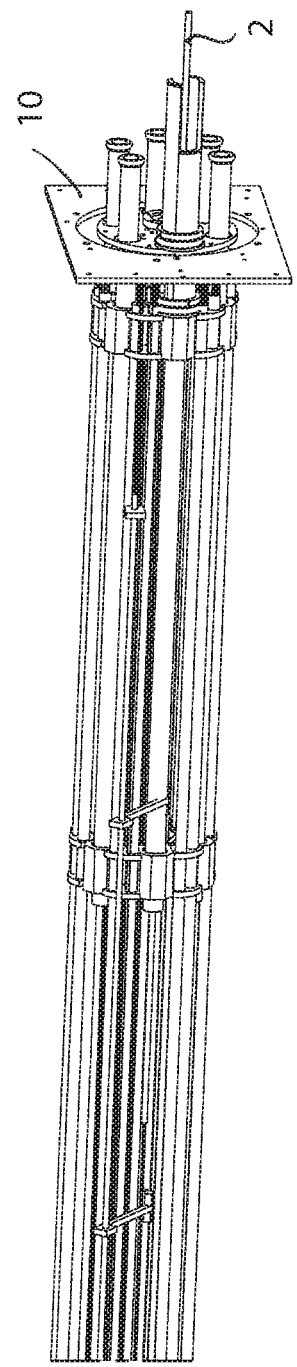

Each sleeve unit 12 is defined by several adjacent parts 12A, 12B that are longitudinally mutually slidable so as to define a containing structure of longitudinally expandable type, which is movable from a contracted containment configuration CC (visible in FIG. 12), to an extended containment configuration EC (visible in FIG. 17).

More precisely, the aforesaid parts that compose a sleeve unit 12 comprise first stationary sleeve portions 12A, arranged for shielding the bar part that protrudes outside beyond the front end $E_A$, and second movable sleeve portions 12B, arranged for screening the bar 2 part comprised between the first carriage 4 and the front end $E_A$ of the drum structure 6.

The first stationary sleeve portions 12A extend, from the front end $E_A$ to the outside of the drum structure 6, to the machine tool. The second movable sleeve portions 12B are connected to the first carriage unit 4 to be dragged to the rear end $E_R$ to move from the contracted containment configuration CC, in which they are gathered together and aligned on, i.e. compacted with, the first stationary sleeve portions 12A, to the extended containment configuration EC in which they are spaced apart from the first stationary sleeve portions 12A.

As mentioned before, the first carriage unit 4 and the second carriage unit 5 each consist of a plurality of carriage elements 15, which are arranged circularly around the longitudinal axis of the drum structure 6 and are slidable along the latter. Each carriage element 15 is shaped as a locking element.

The carriage elements 15 are each provided with respective openings 16, provided with bearings 17, into which the respective tubular elements 3 are inserted. The bearings 17 ensure correct rotation of the tubular elements 3 with respect to the openings 16 in the absence of friction and vibrations.

In the embodiment disclosed here by way of non-limiting example in the attached Figures, the first carriage unit 4 has an annular structure consisting of certain number of carriage elements 15, in this case six (but another desired number is not ruled out) shaped as locking elements, which are arranged circularly around the longitudinal axis of the drum structure 6 and are mutually connected to define a single body.

The carriage elements 15 of the first carriage unit 4 are integrally connected to one another to form an annular structure.

Between one locking element 15 and another coupling elements 26 are interposed, provided with through openings that couple with and are slidable along horizontal guide bars 27 that extend from one end to the other of the drum structure 6.

Also the second carriage unit 5 is formed in a similar manner to what has been disclosed with reference to the first carriage unit 4.

Longitudinal support and guide channels 18 are obtained along the drum structure 6.

The locking elements 15 of the first carriage 4 and of the second carriage 5 are provided with wheel elements 19 placed further inside the annular structure and housed inside, and slidable along the respective longitudinal support and guide channels 18.

According to another possible embodiment (which is not shown), the carriage elements 15 of the first carriage unit 4 are drivable and slidably moveable independently of one another, owing to respective belt or chain elements; in other words, each carriage element 15 can move independently of the other carriage elements 15 with which they define the respective carriage unit. What has just been said applies similarly to the second carriage unit 5. This embodiment enables the apparatus 1 to supply, to a multi-spindle machine, a plurality of bars 2 autonomously and independently of one another to subject such bars 2 simultaneously to several machining tasks that can be, if desired, of different type. It is the versatility of the apparatus 1.

The apparatus 1 comprises a driving device 13 arranged for moving longitudinally, by suitable chain or belt elements 21, or the equivalent, the first carriage unit 4 and the second carriage unit 5 along the drum structure 6.

The driving device 13 is also configured for being able to rotate the drum structure 6 around the longitudinal axis thereof.

Figure 4:
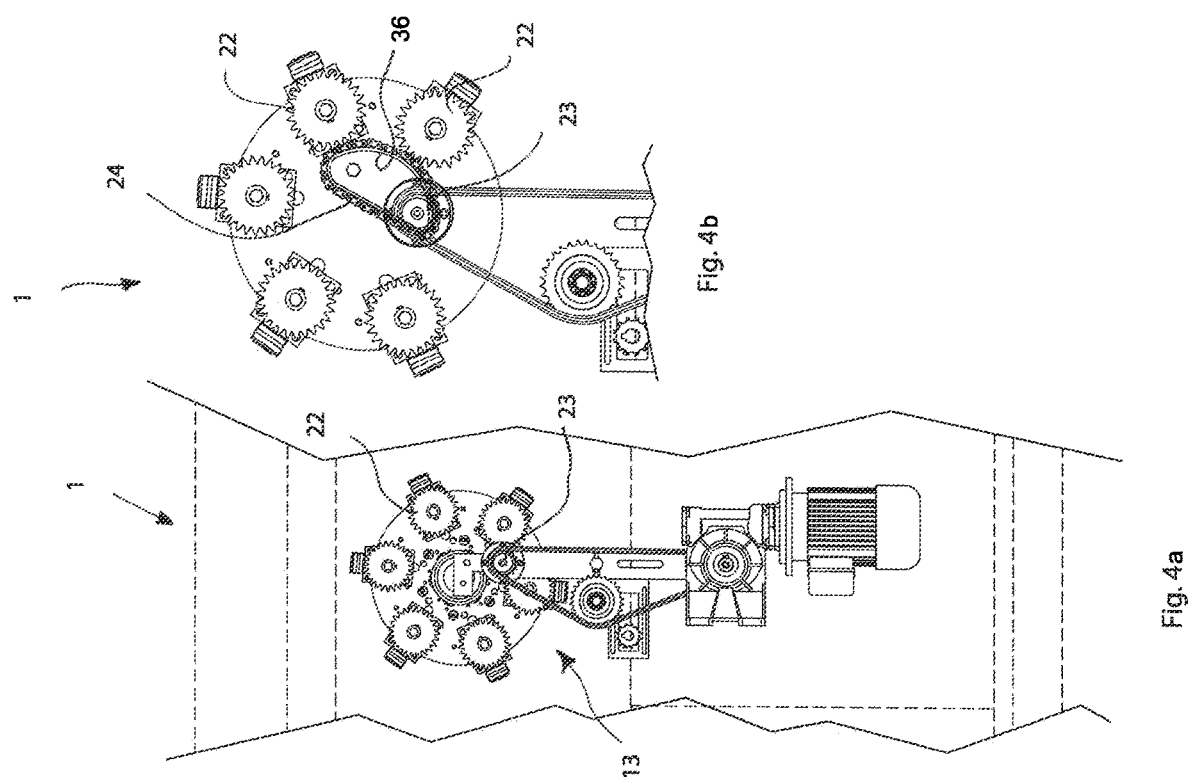
Figure 5:
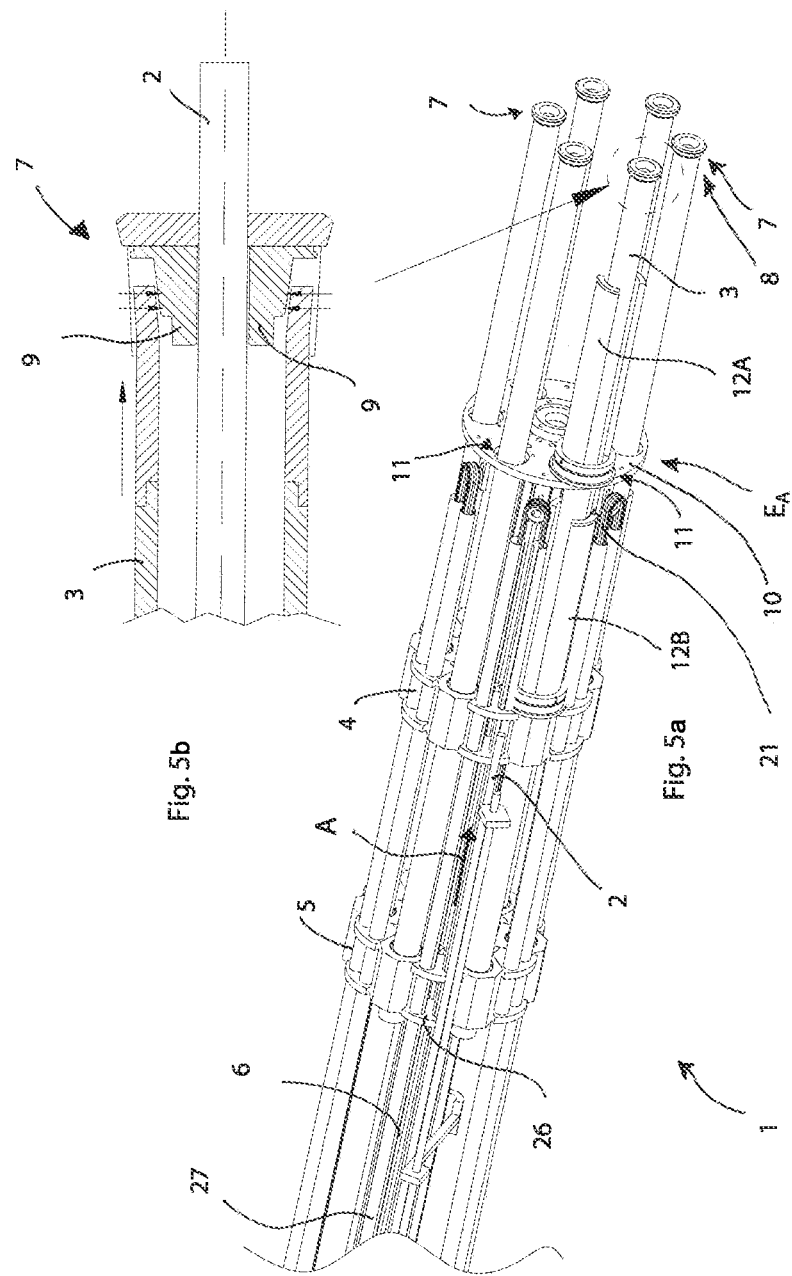
FIG. 5a is an enlarged view of a part of the apparatus shown in FIG. 2.
FIG. 5b shows, in section, a feed finger unit.
Figure 6:
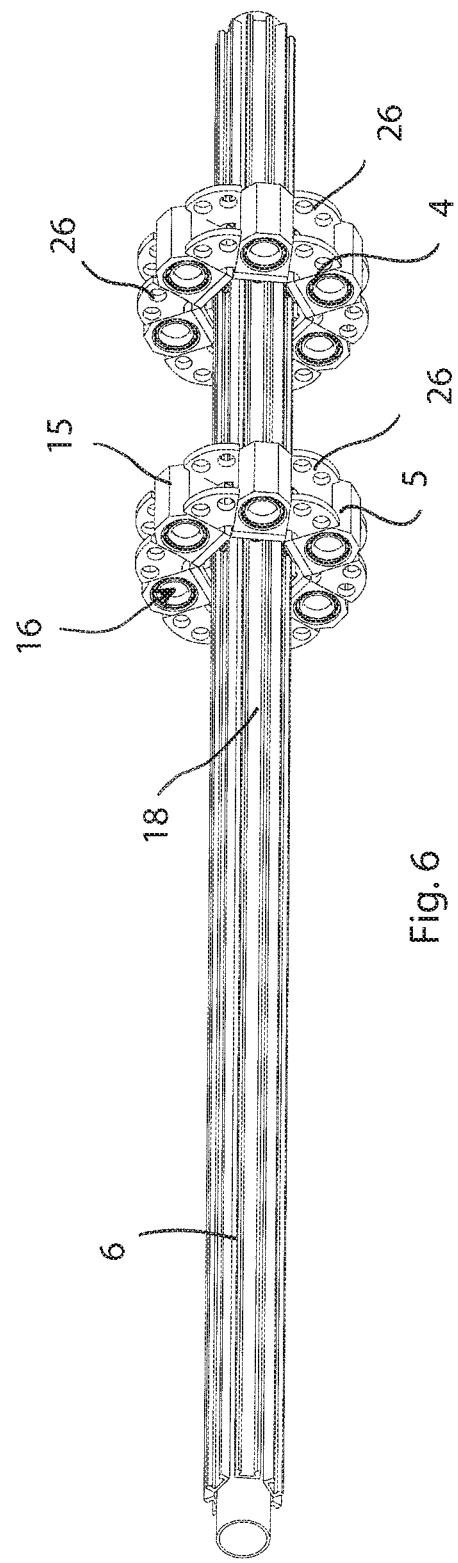
FIGS. 6 and 7 are two different views of a drum structure to which two carriages of the apparatus are slidably fitted.
Figure 7:
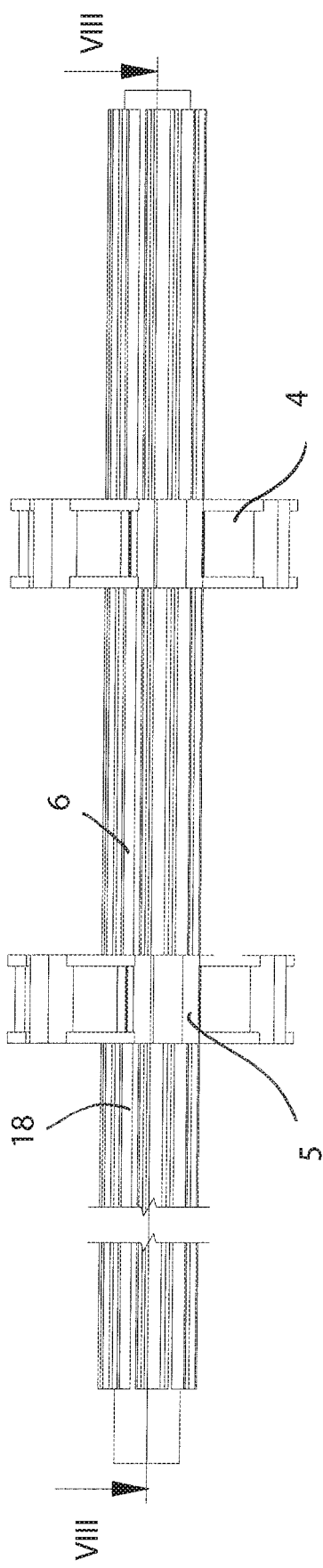
Figure 14:
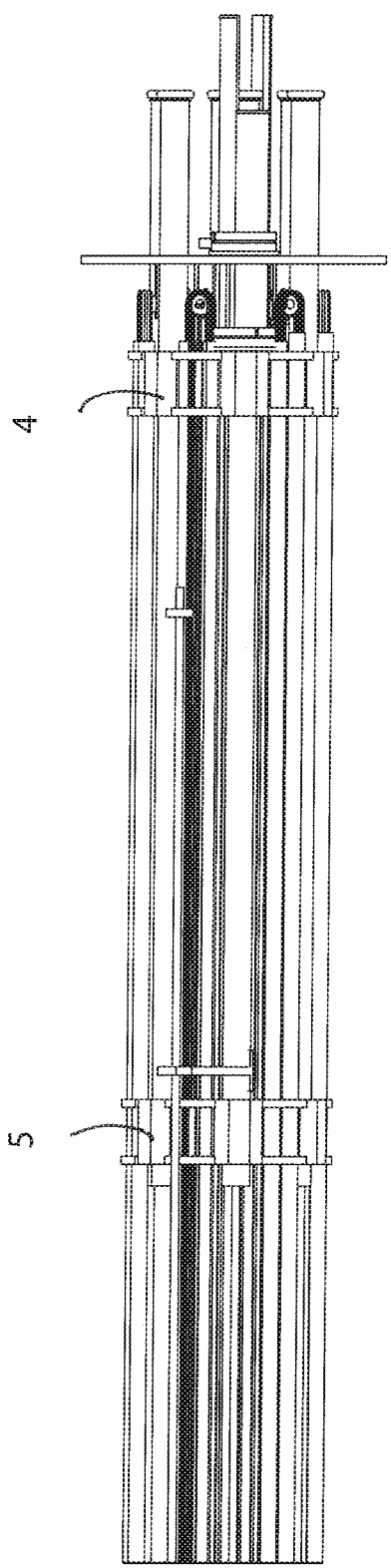
Figure 15:
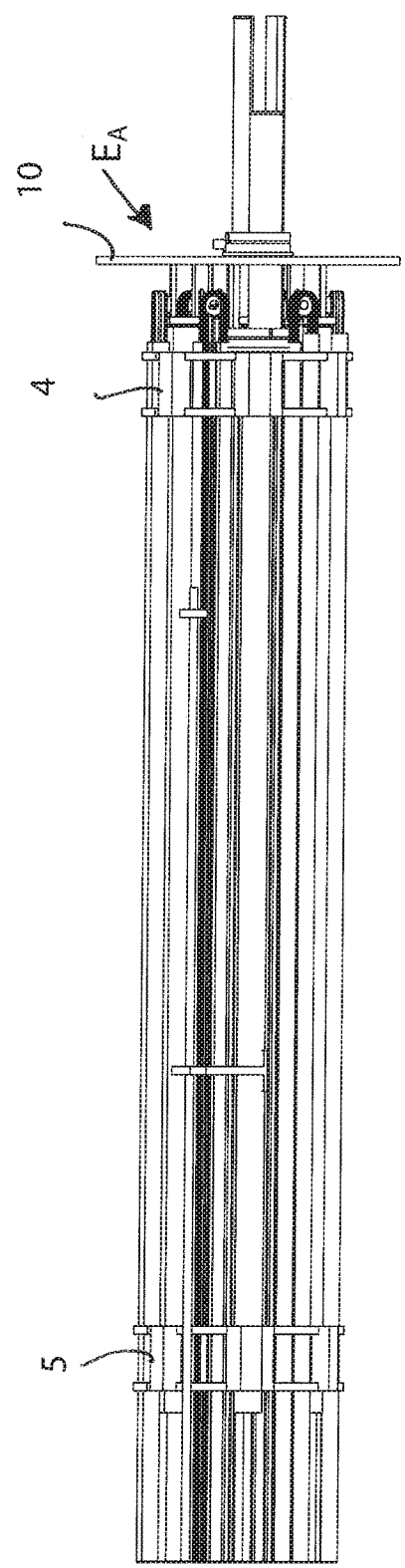
Figure 16:
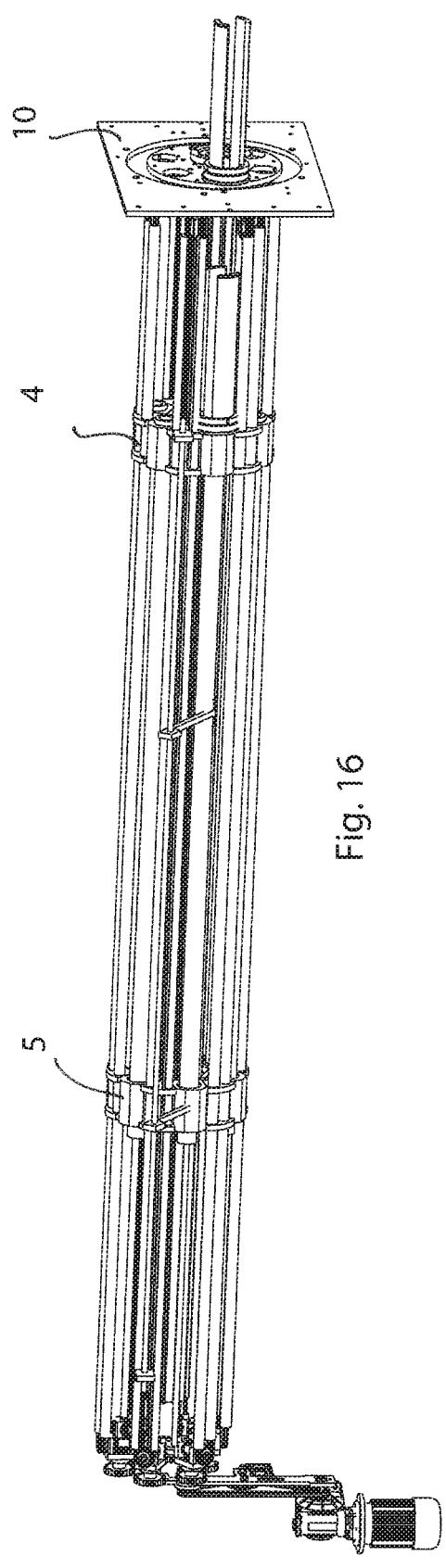

As is visible in FIG. 4a, the driving device 13 has a transmission with a pinion 23 suitable for engaging directly respective gearwheels 22, each associated with a tubular element 3 which can be thus driven. The pinion 23 engages each time a single gearwheel 22, to move the associated tubular element 3.

In one embodiment, shown in FIG. 4b, the driving device 13 comprises a chain element 24 interposed between the pinion 23 and the gearwheels 22. The chain element 24 is wound around, and slides along, a support with an arched guide provide 36 so as to be able to engages simultaneously two adjacent gearwheels 22. In particular, the chain element 24 enables the arch or operating angle to be enlarged in which the pinion 23 remains engaged with each gearwheel 22; in other words, engaging the pinion 23 with a gearwheel 22 occurs not only at an single angular position value of the drum structure but extends to a wider angular interval so as to enable for the example the drive of a carriage to be anticipated, moving the drive already before the drum structure 65 has been rotated in the preset angular supply position of a bar.

This configuration thus enables the device 13 to anticipate the drive of the subsequent gearwheel when the drum structure 6 is rotated by an angular pitch to prepare a subsequent tubular element 3 for the supplying step.

In other words, by widening the field of intervention of the pinion 23, the drive of the carriage units 4 and 5, and thus of the respective feed finger unit 7, is more versatile and—at least partially—unconstrained by the precise angular position of the drum structure 6.

From this configuration clear versatility and optimization of the operating cycles associated with the apparatus 1 arise.

The apparatus 1 comprises, as already mentioned above, a lever unit 20 to support horizontally and load each bar 2 in a respective tubular element 3. The lever unit 20 is rotatable around a rotation axis R parallel to the longitudinal axis of the drum structure 6 to transfer a respective bar 2 to a loading height where it is axially aligned on a respective tubular element 3. Suitable position sensors are provided to detect continuously the angular position of the lever unit 20 to permit the advancement of the carriages, preventing them from interfering therewith. Owing to these sensors, the movement of the lever unit 20 is coordinated with the movement of the carriage units 4 and 5.

The apparatus 1 is provided with sensors 25 to detect the position of the first carriage unit 4 and/or of the second carriage unit 5.

The apparatus 1 also comprises a control and synchronization unit U, operationally connected to the sensors 25 to detect the position of the first carriage unit 4 and of the second carriage unit 5.

The control and synchronization unit U is programmed for driving in a synchronized manner the drum structure 6, the lever unit 20, and the first carriage unit 4 and the second carriage unit 5 to permit loading of each bar 2 in a respective tubular element 3, and the advancement of the bars 2 to the machine tool.

The control and synchronization unit U is configured and programmed to advance each bar 2 by a succession of reciprocating movements forwards and backwards of the second carriage unit 5 until the bar 2 has been supplied completely to the spindle. Further, the control and synchronization unit U is programmed to transfer and release a residual portion of the machined bar 2, in an internal zone Z of the apparatus 1, placed further upstream of the front end $E_A$ with respect to the machine tool. The residual portion is expelled from the respective feed finger unit 7 through the effect of the thrust exerted by a new bar 2 that is loaded and introduced into the respective tubular element 3. Owing to this possibility of releasing the residual portion inside the volume bounded between the two ends of the drum structure 6, any risk is avoided of interfering with and damaging delicate and costly parts/tools of the spindle zone.

The apparatus 1 can operate according to two possible operating modes. According to a first possible operating mode, the control and synchronization unit U drives, in a synchronized manner, the carriage units 4 and 5, the drum structure 6 and the lever unit 20, to arrange in sequence the bars 2 in the respective tubular elements 3. Once all the tubular elements 3 have been loaded, the plurality of bars 2 can be supplied simultaneously to a multiple spindle.

According to another possible operating mode, a tubular element 3 is loaded with a respective bar 2, which is immediately supplied to the spindle (in this case a single spindle).

The tubular elements 3 can be configured and sized to receive the same diameter of bar 2, or can be configured and sized to receive each a bar of a given diameter.

With reference to FIGS. 12 to 23, the operation of the apparatus 1 disclosed above is summarized.

Before loading a bar 2, the first carriage unit 4 and second carriage unit 5 are arranged in the position nearest the front end $E_A$ of the drum structure 6, come shown in FIG. 12, so as not to hinder the operations of movement of the bar 2 by the lever unit 20.

At this point the bar 2, after being removed from the magazine zone, is lowered by the lever unit 20 until it is aligned on the axis of a tubular element 3 intended to receive the bar 2.

The rear carriage unit 5 (rear carriage) is moved away from the front end $E_A$ so that the respective tubular element 3 being dragged is placed on the bar 2 to be loaded. In the position shown in FIG. 15, the operation of inserting the bar 2 into the tubular element 3 is completed.

It should be noted that a possible residual bar portion in the feed finger unit 7 of this tubular element 3 (which arises from a previous cycle of supplying bars to the spindle), is automatically expelled to the zone below the drum structure 6 owing to the thrust that the residual bar portion receives from the new bar 2 during the loading step. The new bar, once the preceding residual bar portion has been expelled, remains engaged with the feed finger unit 7.

In this configuration, the bar 2, which will be subsequently rotated, is effectively protected by the tubular element 3, which covers a substantial part, whereas another part further downstream is at least partially protected by the sleeve unit 12, which is in an extended configuration EC.

A this point, the two carriage units 4, 5 advance in the supplying direction A with a succession of reciprocating movements forwards and backwards, as the successive FIGS. 19 to 23 show, in such a manner as to advance the bar 2 progressively to the spindle. Owing to the sleeve unit 12, in particular to the stationary parts of sleeve 12 that project to the outside from the front end 10 flange, the bar 2 is screened in the part that is to the outside of the drum structure 6, thus achieving even higher safety levels.

In the position shown in FIG. 23, the bar 2 is supplied completely to the spindle, and the carriage units 4 and 5 are already in the correct position to be able to start loading a new bar 2. Thus, there is no downtime waiting for the next bar to be loaded, unlike prior art systems in which it is on the other hand necessary to retract the bar-pushing members completely before proceeding with loading and the subsequent thrust supplying a new bar.

As can be seen from what has been disclosed above, the apparatus 1:
 ensures high operating speed, drastically slashing bar supplying cycle times;
 has an extremely simplified structural and functional configuration, in addition to overall dimensions that are less than those of the prior art,
 has lower manufacturing costs and lower maintenance costs and times.

It is possible to configure and size the apparatus 1 in a desired manner according to the applications for which the apparatus 1 can be intended.

Any component that is part of the apparatus 1 according to the invention can be replaced with other equivalents in structural and functional terms, and the materials, inasmuch as they are compatible with the specific use for which they are intended, can be chosen suitably according to the requirements and according to the available prior art.

Variations on and/or additions to what has been disclosed and illustrated in the attached drawings are possible, without thereby falling outside the claimed area of protection.

The invention claimed is:
1. Apparatus for advancing and supplying bars to a machine tool, comprising:

a plurality of tubular elements each suitable for containing longitudinally a respective bar;

at least one first carriage unit and a second carriage unit supporting said plurality of tubular elements and movable longitudinally on a drum structure to move said tubular elements parallel to an advancement direction of said bars, said drum structure extending from a front end, suitable for being placed in a position adjacent to a spindle of said machine tool, to a rear end, suitable for being further from said machine tool, said drum structure comprising, at said front end, a front end flange, provided with respective openings through which said tubular elements can slidably traverse said front end flange to protrude, beyond said front end, to the spindle of said machine tool, each tubular element of said plurality of tubular elements being provided with a feed finger unit that is suitable for clamping and pulling a respective bar to advance the bar in said advancement direction.

2. Apparatus according to claim 1, wherein each feed finger unit is placed at a front end of the respective tubular element, suitable for being nearer the spindle of said machine tool, and in which each tubular element extends over a length of at least half of a total length of said drum structure.

3. Apparatus according to claim 1, wherein each feed finger unit comprises gripping elements provided with conical coupling surfaces and gripping surfaces for clamping and pulling a respective bar.

4. Apparatus according to claim 3, wherein said gripping elements include gripping surfaces with a sliding friction coefficient, shaped for generating a grip contact with the surface of the respective bar so as to be able to push the latter in said advancement direction to said machine tool, said gripping elements being further configured to loosen the clamping action on the surface of the bar and instead permit a relative slide of said feed finger unit along the surface of said respective bar in a direction opposite the supplying direction of the bar, when the respective tubular element is moved away from the said machine tool.

5. Apparatus according to claim 1, wherein said tubular elements are axially integral with a part of said second carriage unit, and are axially movable with respect to a respective part of said first carriage unit, said first carriage unit and said second carriage unit being movable from a first configuration of mutual proximity in which they are packed to said front end so that said tubular elements protrude towards said machine tool, at a mutually spaced configuration, to a second configuration in which said second carriage unit is further from said front end relative to said first configuration so as to drag said tubular elements to said rear end and permit progressive insertion of a bar into the respective tubular element.

6. Apparatus according to claim 1, wherein the front ends of said tubular elements have a radially widened shape that prevents separation thereof from said first carriage unit and permits dragging of said first carriage unit toward said rear end.

7. Apparatus according to claim 1, further comprising at least one sleeve unit coupled with a respective tubular element, and structurally configured for containing and acting as a protective screen with respect to at least one part of an advancing bar.

8. Apparatus according to claim 7, wherein said at least one sleeve unit is defined by several adjacent parts that are longitudinally mutually slidable so as to define a containing structure of longitudinally expandable type, which is movable from a contracted containment configuration, to an extended containment configuration.

9. Apparatus according to claim 8, wherein said parts that compose said at least one sleeve unit comprise first stationary sleeve portions, arranged for shielding the bar part that protrudes outside beyond said front end, and second movable sleeve portions, arranged for shielding a bar part comprised between said first carriage unit and said front end of said drum structure.

10. Apparatus according to claim 9, wherein said first stationary sleeve portions extend, starting from said front end to the outside of said drum structure to said machine tool, and said second movable sleeve portions are connected to said first carriage unit to be dragged to said rear end to move from said contracted containment configuration, wherein they are gathered together and aligned on said first stationary sleeve portions, to said extended containment configuration in which they are spaced away from said first stationary sleeve portions.

11. Apparatus according to claim 1, wherein each of said first carriage unit and second carriage unit consists of several carriage elements, which are arranged circularly around the longitudinal axis of the drum structure and are slidable along the latter, said carriage elements being provided with respective openings with bearings into which the respective tubular elements are inserted.

12. Apparatus according to claim 11, wherein said first carriage unit and second carriage unit are slidable along horizontal guide bars, the carriage elements of each of said first carriage unit and second carriage unit being integrally connected to one another to form an annular structure into which, between one carriage element and the other coupling elements are interposed that are arranged for sliding along said horizontal guide bars.

13. Apparatus according to claim 11, wherein the carriage elements of said first carriage unit are drivable and slidably moveable independently of one another, and the carriage elements of said second carriage unit are drivable and slidably moveable independently of one another, so as to be able to supply a plurality of bars autonomously and independently of one another.

14. Apparatus according to claim 11, wherein said drum structure includes longitudinal support and guide channels and said locking elements of said first carriage unit and second carriage unit are provided with wheel elements placed more internally in said annular structure and housed inside and slidable along longitudinal support and guide channels.

15. Apparatus according to claim 1, comprising a driving device arranged for moving longitudinally, by suitable chain or belt elements, said first carriage unit and said second carriage unit along said drum structure, and for rotating said drum structure around the longitudinal axis of the latter, said driving device being provided with a pinion and gearwheels transmission for rotating said tubular elements.

16. Apparatus according to claim 15, wherein said driving device comprises a chain element interposed between said pinion and said gearwheels, said chain element being driven by said pinion to engage each time a gearwheel, in which said chain element is wound around, and slides along, a support with an arched guide profile so as to be able to engage a gearwheel on a wider angular portion travelled along by said gearwheel during the rotation of said drum structure.

17. Apparatus according to claim 1, further comprising a lever unit for horizontally supporting and loading each bar in a respective tubular element, said lever unit being rotatable around a rotation axis parallel to the longitudinal axis of said drum structure to transfer a respective bar to a loading height where it is axially aligned on a respective tubular element.

18. Apparatus according to claim 1, and further comprising a control and synchronization unit, operationally connected to sensors to detect the position of said first carriage unit and second carriage unit, and connected to further sensors to detect the position of said lever unit, said control and synchronization unit being programmed for driving in a synchronized manner said drum structure, said lever unit, and said first carriage unit and second carriage unit to permit loading of each bar in a respective tubular element, and the advancement of the bars to said machine tool by a succession of reciprocating movements forwards and backwards of said second carriage unit until the bar has been supplied completely to the spindle, said control and synchronization unit being further programmed to transfer and release a residual portion of the machined bar, in an internal zone of the apparatus, placed further upstream of said front end than said machine tool, said residual portion being expelled from the respective feed finger unit through the effect of the thrust exerted by a new bar that is loaded and introduced into the respective tubular element.

\* \* \* \* \*